United States Patent Office 3,324,109
Patented June 6, 1967

3,324,109
PREPARATION OF A DEGRADED PECTIN
Herman J. Eichel, Dayton, Ohio, assignor to American Hoechst Corporation, a corporation of New York
No Drawing. Filed Aug. 30, 1963, Ser. No. 305,865
1 Claim. (Cl. 260—209.5)

The present invention relates to a new iron preparation and more specifically to an iron-pectin complex prepared with a precisely formulated degraded pectin. The complex which is characterized by good stability and good absorption from the injection site can be used intramuscularly for treatment of iron deficiency anemia.

The principal object of the present invention is to provide a therapeutically useful injectable iron complex with controlled absorption from the injection site.

Another object of the present invention is to provide a reproducible, therapeutically standardized iron complex from readily available materials.

Still another object of the present invention is to provide a stable, water-soluble, injectable ferric hydroxide-degraded pectin complex characterized by its relatively high iron content.

Other objects will be apparent as the description proceeds.

Iron preparations suitable for intramuscular administration have been prepared by complexing iron with various naturally occurring polymeric materials. Various approaches have been taken, but in general, they all are designed to provide a synthetic polysaccharide or other polymeric material, which is of such molecular size that it produces, after complexing with iron, an aqueous solution having some degree of freedom from the toxic reaction of ionic iron. See U.S. Patent Re. 24,642. The solution, on the one hand, must contain a sufficiently high iron concentration to afford a practical dosage form and, on the other hand, must exhibit a viscosity low enough to insure ease of injectability. It has been proposed that complexes with molecular weights substantially less than 5000 are taken up in the blood stream and that complexes with somewhat larger molecular weights are taken up in the lymph. There are two possible extremes. First, there is the small molecular weight complex in which all of the iron is immediately available and appears in the blood stream in a short time after injection. These materials have proven for the most part to be too toxic for ordinary use. The other extreme is that of the very large molecular weight complex which does not move out of the muscle injection site, either via the blood stream or in the lymph flow. These materials are obviously unsatisfactory.

The indicated optimal dosage form should provide an iron complex having a portion with an average molecular weight low enough to allow immediate or relatively fast circulatory transport away from the injection site and having the other portion or residual depot fraction with an average molecular weight high enough to allow continued but relatively slow circulatory transport away from the injection site. In order to arrive at a molecular structure of the desired molecular size range noted above, it is apparent that it is necessary to have very close control over the degradation or synthesis of the polymeric substance. In our investigations we have found commercially available pectin to be the polymeric substance of choice. Also, in our investigations we have found that enzymatic degradation of the pectin with the commercially available enzyme, pectinase, to provide for the critical and all-important reproducible control of the desired over-all molecular size range.

It is known that the molecular weight of degraded pectin can be determined by various means including end group determinations, cryoscopic osmotic and diffusion methods, and ultra-centrifugal and viscosity measurements. All of these analytical procedures have been used by investigators and appear in the literature of pectin studies. Perusal of this literature, however, will show many discrepancies regarding the size of the pectin molecule depending upon the method of assay used. In our investigations in this field we found molecular weight determinations based upon intrinsic viscosity measurements to be the most reliable with the enzymatic degraded pectin and accordingly the average intrinsic viscosity is used herein to characterize the degraded pectin. In our investigations we also found that the intrinsic viscosity of the degraded pectin suitable for use as a complexing agent for iron in accordance with the present invention to be between about 0.04 and 0.25 with the preferred intrinsic viscosity range being 0.045 to 0.1.

The average intrinsic viscosity is obtained as follows. After 48 hours degradation time (see Example I), an aliquot of the degraded pectin solution is removed and successively diluted to obtain concentrations of 0.250%; 0.125% and 0.063%. The viscosity of each of these solutions is then determined at 25° C. using an Ostwald viscosimeter. The calculations involved can be illustrated as follows:

$N$=viscosity of the pectin solution at 25° C. at the given concentration
$N_0$=viscosity of the solvent (water) at 25° C.
$N_{rel}$=relative viscosity
$N_{spec}$=specific viscosity
Conc=percentage concentration of the pectin solution
$N/N_0 = N_{rel}$
$N_{rel} - 1.0 = N_{spec}$
$N_{spec}/\text{Conc}$=viscosity number The relative viscosity ($N_{rel}$) for a given concentration is first obtained by dividing the viscosity ($N$) of a pectin solution at 25° C. with the viscosity ($N_0$) of water at 25° C., and the specific viscosity ($N_{spec}$) then obtained by subtracting 1.0 from the relative viscosity. The viscosity number for each concentration of pectin solution is next calculated by dividing the specific viscosity of the solution with the concentration. The viscosity number is next plotted against the percentage concentration of the solution and the intrinsic viscosity of the degraded pectin obtained by extrapolating the resulting graph to infinite dilution. See Introduction to Colloid Chemistry, Mysels, K. J., page 276, 1959); Encyclopedic Dictionary of Physics, 7, 644 (1962).

The iron-pectin complex is formed by mixing an aqueous solution of the degraded pectin having an intrinsic viscosity at 25° C. between about 0.04 to 0.25, with an aqueous solution of a ferric salt such as ferric chloride, and then adding alkali such as aqueous sodium hydroxide to form ferric hydroxide in situ in the alkaline degraded pectin solution. The resulting composition, which is water-soluble, comprises essentially a substantially nonionic complex of ferric hydroxide with the degraded pectin having an average intrinsic viscosity at 25° C. between about 0.04 to 2.5. The elemental iron present in the ferric hydroxide-pectin complex is in the range of about 13.1 to 14.9%, with an average elemental iron content of about 14.5% by weight. The complex is readily soluble in water and forms easily injectable solutions of low viscosity containing up to 100 mg. of iron per ml., i.e. solutions containing up to 10% w./v. of elemental iron.

GENERAL PROCEDURE

A 10 percent (by weight) aqueous solution of pectin is first prepared by adding pectin to distilled water at about 60–70° C. with rapid stirring until the solution becomes homogeneous. Degradation is accomplished by adding 3% by weight of pectinase, based on the weight of the pectin, to the pectin solution which is maintained at about 60° C. Additional amounts (1% based on the weight of the pectin) are preferably added after about 6–8 hours and again after about 24 hours, with degradation by the enzyme continuing for a total of 48 hours. The degraded pectin solution is then filtered to remove any insoluble material and the intrinsic viscosity of the degraded pectin, which lies between about 0.04 and about 0.25, is determined as noted above.

An aqueous solution of ferric chloride, or equivalent water-soluble iron salt, containing 200 mg. of elemental iron (Fe)/ml. is next added to the filtered degraded pectin solution in a ratio of 1 ml. of ferric chloride solution per gram of pectin used. The solution is preferably warmed to 50–60° C. and then made alkaline with sodium hydroxide, or equivalent alkaline material, to pH 10. The resulting reaction mixture containing the ferric hydroxide-degraded pectin complex in solution is centrifuged to remove uncomplexed iron or other insoluble material and the complex then precipitated from the clear supernatant by addition of methanol. The precipitated complex is recovered, e.g. by filtration, washed with 80/20 methanol-water until the washings are neutral and then preferably finally washed with pure methanol followed by acetone and allowed to air dry for several hours. Occluded solvent can be driven off by warming at 40° C. for an hour. Where further purification is desired the dry powder can be dissolved in a minimum amount of water and the resulting solution then dialyzed against water using a cellophane or like membrane until the dialysis water is free of iron. For injection purposes, the dialyzed solution is concentrated to the desired iron content, 0.4% salt and 0.5% phenol are added, with a final adjustment of the pH to 7.5.

*Example I*

Three hundred thirty-three grams (333 g.) of pectin (Sunkist Pectin N.F.) was first disslovsed in 3 liters of distilled water at 60–70° C. The mixture was stirred rapidly during the addition of the pectin and the stirring was continued, e.g. for about an hour, until a homogeneous paste was obtained. Ten grams (10 g.) of pectinase, pectinase D concentrate enzyme (Miles Chemical Co.), in 50 ml. of distilled water was next added to the paste with stirring. The system was held at about 60° C. in a water bath. After 6 hours, 3.3 g. of pectinase in powdered form was added with stirring to the partially degraded pectin solution. Finally, after 24 hours, 3.3 g. of pectinase in powdered form was added to degraded pectin solution and degradation allowed to proceed for an additional 24 hours, i.e. a total degradation time of 48 hours. The solution was then gravity filtered and its viscosity, determined on an Ostwald viscosimeter, was found to be 1.36 cps. The intrinsic viscosity of the degraded pectin, determined as noted above, was found to be about 0.045, which corresponds to an average molecular weight of approximately 2200.

To the filtered degraded pectin solution was next added, with stirring, 333 ml. of an aqueous ferric chloride solution containing 200 mg. of elemental iron per ml., and the resulting solution warmed in a 6° C. water bath for 45 minutes. The solution was then brought to pH 10 with 50% aqueous sodium hydroxide solution and heated in a 100° C. bath for one hour. After 30 minutes the pH which had dropped to 9.0 was readjusted with the sodium hydroxide solution to pH 9.8. The basic solution was then cooled to room temperature and centrifuged for about 30 minutes. Seven (7) liters of methanol was then added to the recovered supernatant to precipitate the ferric hydroxide-degraded pectin complex and the resulting mixture allowed to stand overnight. The precipitate was suction filtered and successively washed with 80/20 methanol-water until the washings were neutral. The precipitate was finally washed with pure methanol and then acetone, allowed to air dry overnight and then oven-dried at 40° C. for one hour, to yield 380 grams of a fluffy, buff-colored powder containing 14.9% by weight of iron. Two hundred grams (200 g.) of this powder was dialyzed as noted above, and then concentrated to yield an aqueous injectable solution containing 83 mg. of iron per ml. The resulting solution containing over 8% w./v. of iron has good shelf-life.

*Example II*

This example follows the general procedure except that the homogeneous pectin solution is allowed to hydrate for about an hour before addition of the enzyme. Also, before addition of ferric chloride solution the degraded pectin solution is acidified to pH 2 with hydrochloric acid. After heating, this is then followed by addition of sodium hydroxide to pH 10 to form the complex as in the general procedure. Isolation of the complex is accomplished by addition of methanol or like water-miscible solvent, with or without dialysis.

It is claimed:

The process of preparing a degraded pectin having an intrinsic viscosity of between about 0.04 to 0.25, which comprises adding pectin to water at about 60–70° C. with stirring to form a homogeneous solution of pectin containing about 10% by weight of pectin, adding 3% by weight of pectinase, based on the weight of the pectin, to the pectin solution, after about 6–8 hours and again after about 24 hours, adding additional amounts of pectinase, 1% based on the weight of the pectin, to the solution of partially degraded pectin, and then after a total of about 48 hours, filtering the solution of pectinase degraded pectin to remove insoluble material.

References Cited

UNITED STATES PATENTS

| | | | |
|---|---|---|---|
| 2,425,947 | 8/1946 | Leo et al. | 260—209.5 |
| 2,586,407 | 4/1949 | Walsh et al. | 260—209.5 |
| 2,599,564 | 6/1952 | Lee | 260—909.5 |
| 2,982,690 | 5/1961 | Ratcliff | 167—68 |
| 3,065,138 | 11/1962 | Lynch | 167—68 |

OTHER REFERENCES

Industrial Gums, R. Whistler (1959), Academic Press, New York and London (P.O.S.L.), pages 390–400.

William Elwell, Pectin, Its Manufacture, Properties, and Uses (State of Washington, 1939; pages 41 and 50–51).

DONALD E. CZAJA, *Primary Examiner.*

LEON J. BERCOVITZ, FRANK CACCIAPAGLIA, Jr., R. W. MULCAHY, *Assistant Examiners.*